(12) United States Patent
Takashima

(10) Patent No.: US 10,568,279 B2
(45) Date of Patent: Feb. 25, 2020

(54) PLANT CULTIVATION DEVICE

(71) Applicants: FUJI SEIKO CO., LTD., Hashima-shi (JP); FUJI SHOJI CO., LTD., Hashima-shi (JP)

(72) Inventor: Katsunori Takashima, Hashima (JP)

(73) Assignees: FUJI SEIKO CO., LTD., Hashima-shi (JP); FUJI SHOJI CO., LTD., Hashima-shi (JP)

( * ) Notice: Subject to any disclaimer, the term of this patent is extended or adjusted under 35 U.S.C. 154(b) by 221 days.

(21) Appl. No.: 15/548,541

(22) PCT Filed: Feb. 6, 2015

(86) PCT No.: PCT/JP2015/053348
§ 371 (c)(1),
(2) Date: Aug. 3, 2017

(87) PCT Pub. No.: WO2016/125297
PCT Pub. Date: Aug. 11, 2016

(65) Prior Publication Data
US 2018/0014481 A1   Jan. 18, 2018

(51) Int. Cl.
*A01G 31/04* (2006.01)
*A01G 9/029* (2018.01)
(Continued)

(52) U.S. Cl.
CPC ............ *A01G 31/04* (2013.01); *A01G 7/045* (2013.01); *A01G 9/0295* (2018.02); *A01G 27/005* (2013.01)

(58) Field of Classification Search
CPC .... A01G 7/045; A01G 9/0295; A01G 27/005; A01G 31/00; A01G 31/02; A01G 31/05; A01G 31/045
(Continued)

(56) References Cited

U.S. PATENT DOCUMENTS 4,028,847 A * 6/1977 Davis .................. A01G 31/042
47/65
4,166,341 A * 9/1979 Vestergaard ......... A01G 31/042
47/59 R
(Continued)

FOREIGN PATENT DOCUMENTS

CN    1447646 A    10/2003
CN    101731135 A   6/2010
(Continued)

OTHER PUBLICATIONS

International Search Report dated Apr. 21, 2015, in PCT/JP2015/053348 filed Feb. 6, 2015.
(Continued)

*Primary Examiner* — Lisa L Tsang
(74) *Attorney, Agent, or Firm* — Oblon, McClelland, Maier & Neustadt, L.L.P.

(57) ABSTRACT

A plant cultivation device includes a first plate portion formed in a plate shape extending in a transfer direction from the fluid passage member and a second plate portion formed in a plate shape extending in a direction opposite to the transfer direction from the fluid passage member. When the distance between the two neighboring fluid passage members becomes large, the second plate portion provided on the preceding fluid passage member and the first plate portion provided on the following fluid passage member are separated from each other with respect to the transfer direction. The plant cultivation device saves space particularly in an early raising stage of the leaves, keeping protection of the cultivated leaves not to be drooped down.

15 Claims, 6 Drawing Sheets

(51) Int. Cl.
*A01G 7/04* (2006.01)
*A01G 27/00* (2006.01)

(58) Field of Classification Search
USPC .................. 47/59 R, 62 R, 62 C, 63, 65, 79
See application file for complete search history.

(56) References Cited

U.S. PATENT DOCUMENTS

| | | | | |
|---|---|---|---|---|
| 4,216,618 | A * | 8/1980 | Haub | A01G 31/045 47/39 |
| 4,337,986 | A | 7/1982 | Haub et al. | |
| 4,379,375 | A * | 4/1983 | Eisenberg | A01G 31/02 47/65 |
| 4,476,651 | A * | 10/1984 | Drury | A01G 31/042 47/65 |
| 4,617,755 | A * | 10/1986 | Ikeda | A01G 31/045 47/65 |
| 4,669,217 | A * | 6/1987 | Fraze | A01G 31/02 47/64 |
| 4,916,856 | A * | 4/1990 | Bourgogne | A01G 31/042 47/62 R |
| 5,323,567 | A * | 6/1994 | Nakayama | A01G 7/045 47/63 |
| 7,263,799 | B2 * | 9/2007 | Van Zanten | A01G 9/04 198/465.2 |
| 9,510,524 | B2 * | 12/2016 | Anderson | A01G 9/247 |
| 2012/0124907 | A1 * | 5/2012 | Daas | A01G 9/088 47/86 |
| 2015/0135592 | A1 * | 5/2015 | Lin | A01G 9/0295 47/86 |

FOREIGN PATENT DOCUMENTS

| | | |
|---|---|---|
| CN | 203748326 U | 8/2014 |
| JP | 62-55029 A | 3/1987 |
| JP | 63-240731 A | 10/1988 |
| JP | 11-127711 A | 5/1999 |
| JP | 11-155373 A | 6/1999 |
| JP | 2001-178289 A | 7/2001 |
| JP | 2003-265048 A | 9/2003 |

OTHER PUBLICATIONS

Chinese Office Action issued in Chinese Patent Application No. 201580075296.6 dated Nov. 4, 2019, (w/ English Translation).

* cited by examiner

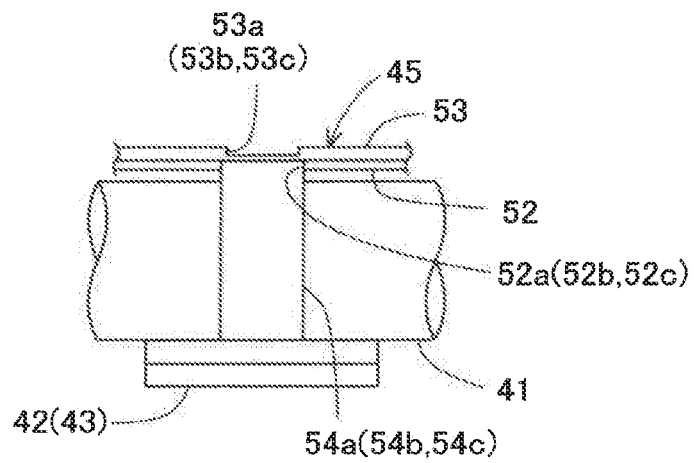
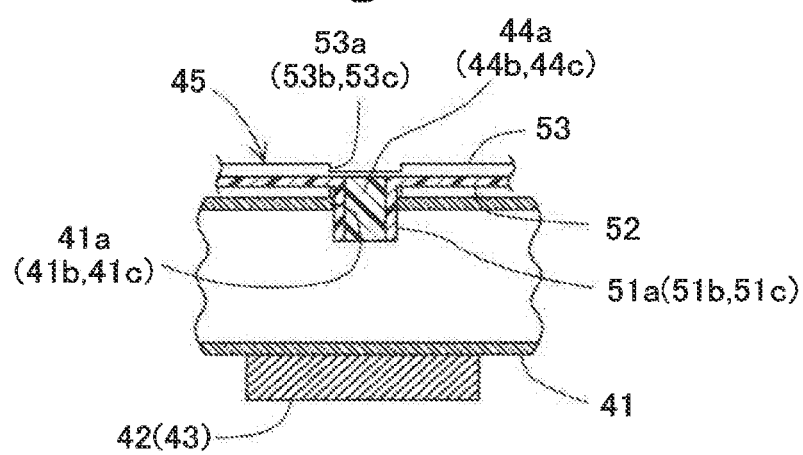
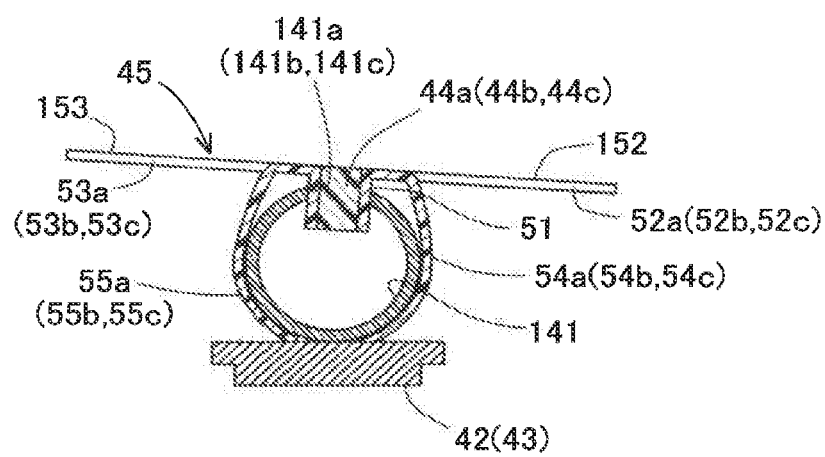

PLANT CULTIVATION DEVICE

TECHNICAL FIELD

The present invention relates to a plant cultivation device.

BACKGROUND ART

A method for cultivating plants indoors, enabling the plants to strike roots into the fluid passage member, through which the culture fluid flows, has been disclosed, for example, in Patent Literatures 1 and 2. Further, the Patent Literature 2 describes that the plants are movable in one direction according to the growth of the plants. In other words, seeds or the nursery plants are arranged at the upstream side with respect to the moving direction and the sufficiently grown plants are arranged at the downstream side with respect to the moving direction. Still further, the neighboring plants are arranged to have sufficient space therebetween in order to respond to the size change associated with the growth of the plants.

Further, Patent Literature 3 discloses that the height of the light source is changed in accordance with the growth of the plants. Patent Literature 4 discloses the protection member which makes the floral buds of the plants to grow straightly erecting upright.

CITATION LIST

Patent Literature

[Patent Literature 1] JP H11 (1999)-155373 A
[Patent Literature 2] JP S62 (1987)-55029 A
[Patent Literature 3] JP S63 (1988)-240731 A
[Patent Literature 4] JP 2003-265048 A

SUMMARY OF INVENTION

Technical Problem

Regarding to the plants with leaves, such as for example, lettuces, the leaves are desired to be prevented from drooping down under the cultivated state. As disclosed in Patent Literature 1, this issue can be solved by providing a plate shaped base. However, since the width of the cultivation base is adjusted to be the width of the plant in the latter stage of cultivation, the size of the base may be oversized for plants in an early stage. Therefore, a large width size cultivation base must be secured for the plants at an early stage of cultivation and an effective space utilization cannot be achieved.

The objective of the invention is to provide a plant cultivation device which can achieve an effective space use for the plants in an early stage, yet preventing the leaves of the plants under the cultivated state from drooping down.

Solution to Problem

The plant cultivation device according to the present invention is characterized in that the plant cultivation device includes a plurality of fluid passage members formed with a fluid passage, through which a culture fluid flows and formed with a through-hole on an upper surface thereof, a transfer mechanism which transfers the plurality of fluid passage members such that a distance between two neighboring fluid passage members among the plurality of fluid passage members becomes variable, a seedling culture medium, on which seeds of a plant are arranged, a culture medium holding portion formed in a cylindrical shape, accommodating therein the seedling culture medium to hold thereof, inserted into the through-hole of the plurality of the fluid passage members or arranged in communication with the through-hole of the plurality of fluid passage members and absorbing the culture fluid into the seedling culture medium, a first plate portion provided on an upper side of the fluid passage members and formed in a plate shape extending in a transfer direction from the fluid passage members and a second plate portion provided on the upper side of the fluid passage members and formed in a plate shape extending in a direction opposite to the transfer direction from the fluid passage members.

When the distance between the two neighboring fluid passage members becomes small, the second plate portion provided on a preceding fluid passage member and the first plate portion provided on a following fluid passage member are overlapped in an up/down direction and when the distance between the two neighboring fluid passage members becomes large, the second plate portion provided on the preceding fluid passage member and the first plate portion provided on the following fluid passage member are separated from each other with respect to the transfer direction.

Under the state that the second plate portion provided on the preceding fluid passage member and the first plate portion provided on the following fluid passage member are overlapped in the up/down direction, the distance between the neighboring fluid passage members can be lessened. On the other hand, under the state that the second plate portion provided on the preceding fluid passage member and the first plate portion provided on the following fluid passage member are separated from each other with respect to the transfer direction, the leaves under the cultivated state are protected by the first and the second plate portions not to be drooped down in sufficiently wide range. Thus, the plant cultivation device can effectively save the space for the plants particularly in an early cultivation stage, protecting the leaves under a cultivated state by preventing the leaves from drooping down.

BRIEF DESCRIPTION OF DRAWINGS

FIG. 7 is a view of the transfer unit shown in FIG. 6, but seen from the right side.

FIG. 8 is a cross sectional view cut along the line 8-8 of FIG. 6.

FIG. 9 is a view showing a transfer unit of the plant cultivation device according a modified embodiment of the first embodiment.

DESCRIPTION OF EMBODIMENTS

<First Embodiment>

(1. Overall Structure of Plant Cultivation Device)

Figure 1:
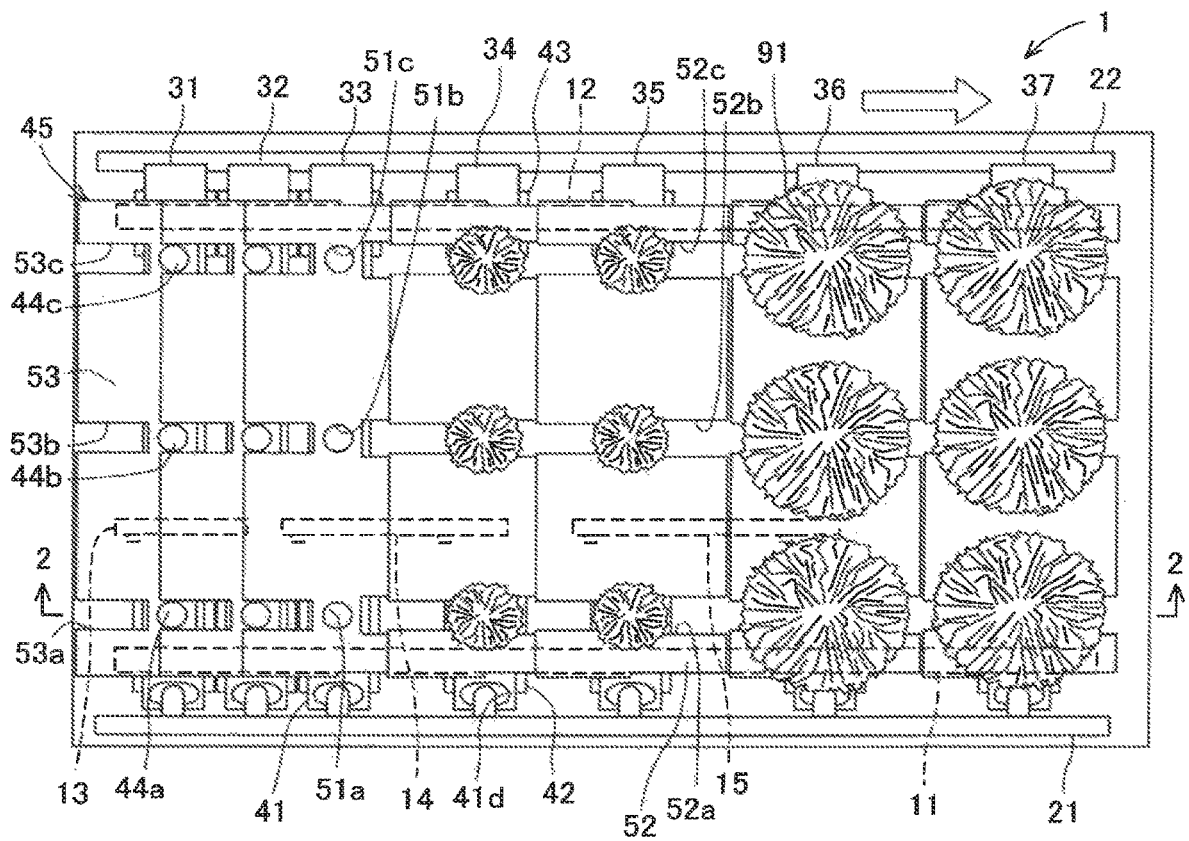
FIG. 1 is a plane view of the plant cultivation device associated with the embodiment of the invention, but FIG. 1 is a view in which a lighting device is omitted.
Figure 2:
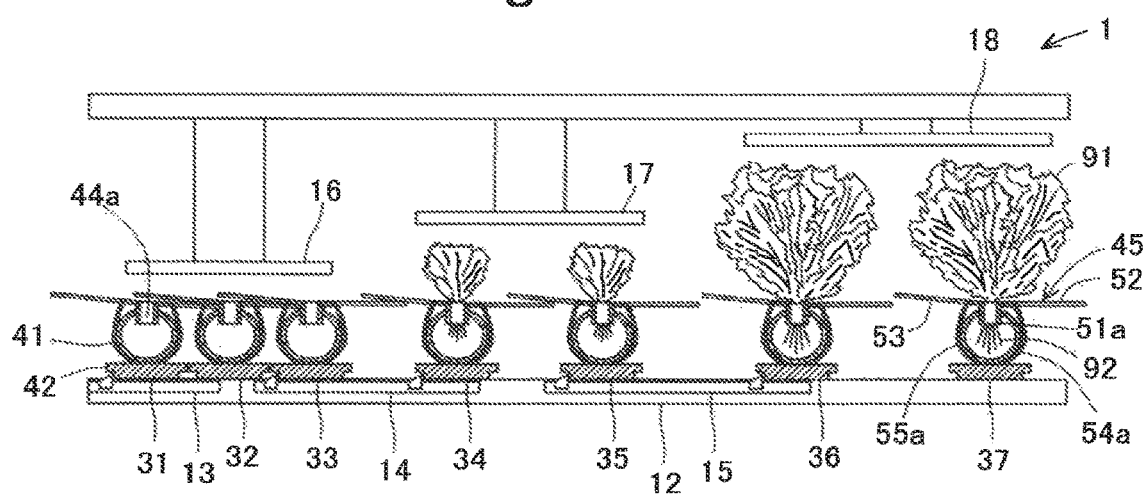
FIG. 2 is a cross-sectional view, cut along the line 2-2 of FIG. 1.

The overall structure of the plant cultivation device 1 will be explained with reference to FIGS. 1 through FIG. 3. In FIGS. 1 and 2, the transfer units 31 through 37 of the plant cultivation device 1 are transferred from left to right as viewed in FIG. 1 (in an arrow direction). A worker feeds a new transfer unit 31 at the left side as viewed in the drawing and collects the transfer unit 37 at the right side as viewed in the drawing.

As shown in FIGS. 1 and 2, the plant cultivation device 1 is provided with a pair of rails 11 and 12, the transfer mechanisms 13 through 15, lighting devices 16 through 18, a culture fluid supplying portion 21 and a culture fluid collecting portion 22, as the portions originally prepared in advance. Further, the plant cultivation device 1 also is provided with the transfer units 31 through 37 for holding the plants, as a movable body. The transfer units 31 through 37 are transferred in a transfer direction sequentially.

The pair of rails 11 and 12 is provided in parallel with each other extending in the transfer direction of the transfer units 31 through 37 (in the arrow direction of FIG. 1). The pair of rails 11 and 12 is provided for guiding the transferring of the transfer units 31 through 37.

Figure 3:
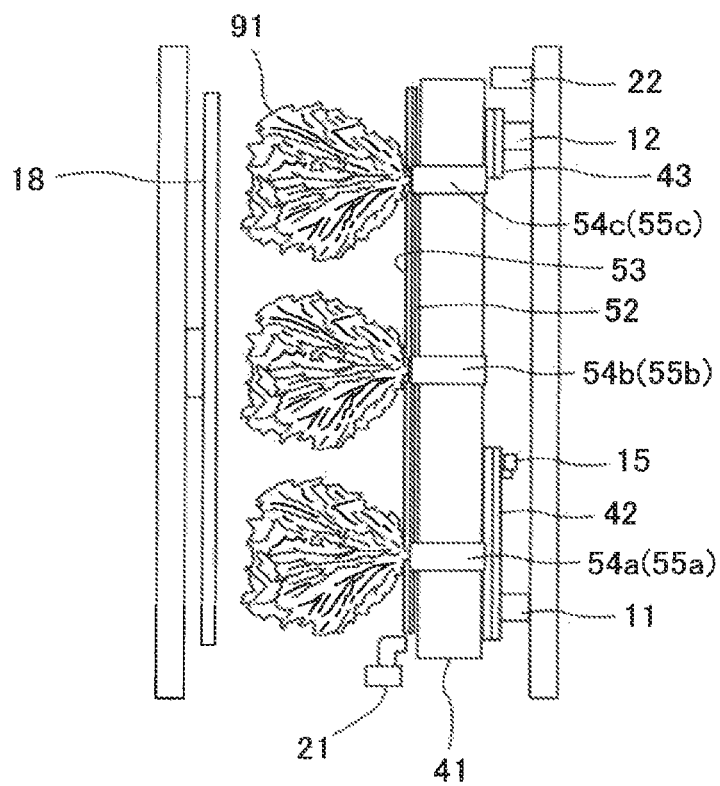
FIG. 3 is a view of the plant cultivation device in FIG. 1 but seen from the right side.

The transfer mechanisms 13 through 15 are provided between the pair of rails 11 and 12, respectively, as shown in FIGS. 2 and 3 and transfer the transfer units 31 through 37 in the transfer direction. The first transfer mechanism 13 transfers the transfer units 31 and 32 to the respective next positions. The second transfer mechanism 14 is provided at the downstream side of the transfer direction with respect to the first transfer mechanism 13 in series therewith. The second transfer mechanism 14 transfers the transfer units 33 and 34 to the respective next positions. The third transfer mechanism 15 is provided at the downstream side of the transfer direction with respect to the second transfer mechanism 14 in series therewith. The third transfer mechanism 15 transfers the transfer units 35 through 37 to the respective next positions. It is noted that the transfer mechanisms 13 through 15 are structured to be a so-called one-way clutch which can return the transfer mechanisms 13 through 15 from the state shown in FIG. 3 to the state shown in FIG. 2.

The transferring distances of the transfer mechanisms 13 through 15 are set to become longer in order from the transferring distance by the first transfer mechanism 13, the transferring distance by the second transfer mechanism 14 and the transferring distance by the third transfer mechanism 15. In other words, the distances of the mutually neighboring transfer units 31 through 33 are the shortest, the distances between the mutually neighboring transfer units 33 through 35 are the second shortest and the distances of the mutually neighboring transfer units 35 through 37 are the longest. Thus, the transfer mechanisms 13 through 15 transfer the transfer units 31 through 37 by changing the distances of mutually neighboring transfer units 31 through 37.

The lighting devices 16 through 18 shed light over the plants held on the transfer units 31 through 37 by which the plants are to be transferred. The height of each lighting device 16 through 18 is different from one another. The first lighting device 16 is provided at the positions corresponding to the transfer units 31 through 33. This position of the first lighting device 16 is the lowest among the three. The second lighting device 17 is provided at the position corresponding to the positions of the transfer units 34 and 35 and this position is higher than the position of the first lighting device 16. The third lighting device 18 is provided at the position corresponding to the positions of the transfer units 36 and 37 and this position is higher than the position of the second lighting device.

The culture fluid supplying portion 21 is provided at outside one (lower side as viewed in FIG. 1) of the pair of rails 11 and 12 which is arranged in mutually opposing direction (up/down direction as viewed in FIG. 1). The culture fluid supplying portion 21 supplies the fluid passage member 41 which forms the position fixed transfer units 31 through 37 with the culture fluid. The culture fluid collecting portion 22 is provided at the other outside one (upper side as viewed in FIG. 1) of the pair of rails 11 and 12 which is arranged in opposing direction. The culture fluid collecting portion 22 collects the culture fluid discharged from the fluid passage member 41 which forms the position fixed transfer units 31 through 37.

(2. Outline of Transfer Unit)

Each of the transfer units 31 through 37 will be explained with reference to FIG. 4 through 8, in addition to FIGS. 1 through 3. Each transfer unit 31 through 37 is provided with the fluid passage member 41, supporting members 42 and 43, seedling culture media 44a through 44c and a plant holding portion 45.

The fluid passage member 41 is formed in a cylindrical shape and is provided with a fluid passage through which the culture fluid flows. According to the embodiment, the shape of the fluid passage member is cylindrical with a circular cross section, however, the shape is not limited to cylindrical with the circular cross section and for example, a rectangular tube shape may be used. A plurality of through-holes 41a through 41c is provided on the upper surface of the fluid passage member 41 extending along the fluid passage with predetermined intervals separated from one another. According to the embodiment, the through-holes are formed in circular shape holes. A hole is provided at the upper surface of one end of the fluid passage member 41 through which the culture fluid from the culture fluid supplying portion 21 is supplied. Another through hole (not shown) is provided at the upper surface of the other end of the fluid passage member 41 for discharging the culture fluid to the culture fluid collecting portion 22. The culture fluid is flown from the one end side towards the other end side of the fluid passage member 41.

The supporting members 42 and 43 are provided at the lower surface of the fluid passage member 41 and positioned corresponding to the positions of the pair of rails 11 and 12, respectively. The supporting member 42 moves on the pair of rails 11 and 12 and further, the supporting member 42 is engaged with the transfer mechanisms 13 through 15 in the transfer direction and movable according to the operation of the transfer mechanisms 13 through 15. In other words, by the movement of the supporting members 42 and 43 in the transfer direction, the fluid passage member 41 moves in the transfer direction.

The seeds are arranged on the seedling culture media 44a through 44c. According to the embodiment, the seedling culture media 44a through 44c are formed in a columnar shape. The seedling culture media 44a through 44c are made by a material which can absorb the culture fluid which flows through the inside of the fluid passage member 41.

The plant holding portions 45 is formed in a cylindrical shape and is made by material such as for example, by PP (Polypropylene) resin or PET (Polyethylene Terephthalate) resin and formed integrally by press forming. The plant holding portion 45 is formed to be a film with, for example, several millimeters in thickness having a flexible characteristic. The plant holding portion includes culture medium holding portions 51a through 51c, a first plate portion 52, a second plate portion 53, first winding portions 54a through 54c and second winding portions 55a through 55c.

The culture medium holding portions 51a through 51c are formed in a cylindrical shape with a circular cross section as shown in FIGS. 2, 3, 5, 7 and 8. The culture medium holding portions 51a through 51c accommodate and hold the seedling culture media 44a through 44c. The culture medium holding portions 51a through 51c are inserted into the plurality of through-holes 41a through 41c of the fluid passage member 41. Portions of the culture medium holding portions 51a through 51c are projecting upward from the through-holes 41a through 41c. In other words, the culture medium holding portions 51a through 51c are arranged projecting outside of the fluid passage member 41 to form a gap between the first and the second plate portions 52 and 53 and the fluid passage member 41. On the other hand, portions of the remaining portions of the culture medium holding portions 51a through 51c are immersed in the culture fluid which flows through the inside of the fluid passage member 41 and accordingly, the culture medium holding portions 51a through 51c are positioned where the culture fluid is absorbed in the seedling culture media 44a through 44c.

Figure 5:
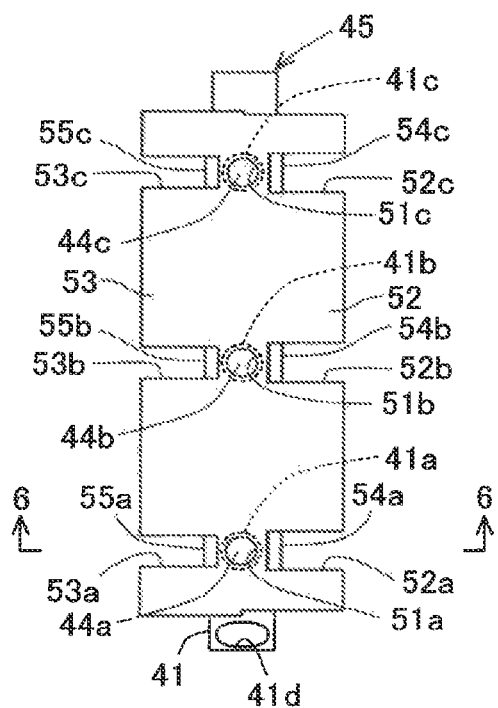
FIG. 5 is a plane view of the transfer unit shown in FIG. 1.

The first plate portion 52 is provided at the upper side of the fluid passage member 41 and is formed to be extending in a transfer direction (downstream side, or right side as viewed in FIG. 1) from the fluid passage member 41. As shown in FIG. 5, the first plate portion 52 is formed such that the tip end side and the base end side is positioned on horizontal plane, or the tip end side is positioned downward from the horizontal plane relative to the base end side. Further, the first plate portion 52 is provided with a plurality of first slits 52a through 52c at the positions corresponding to the positions of the culture medium holding portions 51a through 51c. The first slits 52a through 52c are open to the tip end side of the first plate portion 52. The width of each first slit 52a through 52c is set to be larger than each width of the culture medium holding portions 51a through 51c.

Figure 4:
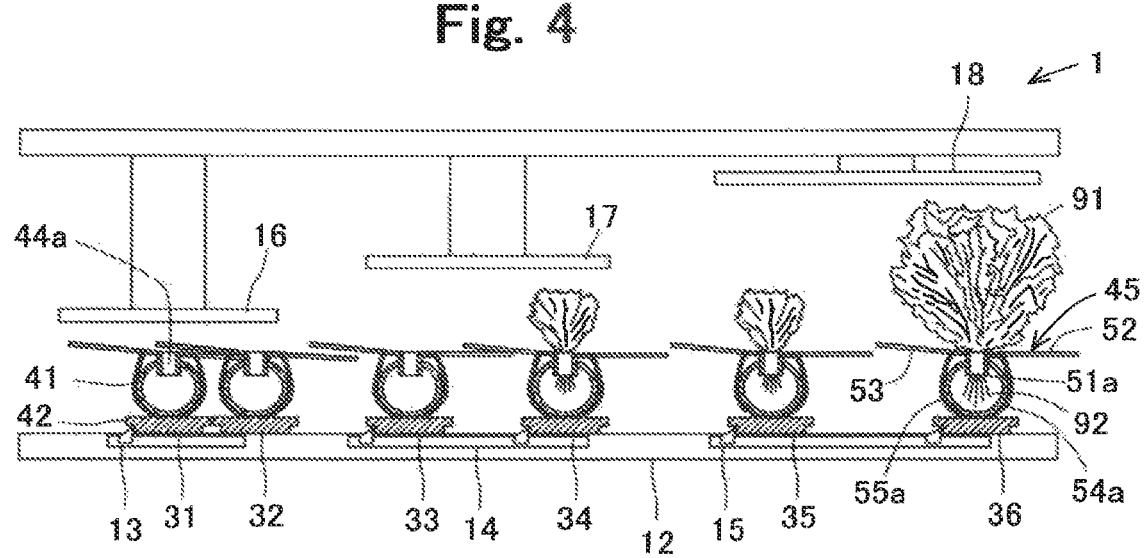
FIG. 4 is a view showing a state of plants of the plant cultivation device transferred from the state shown in FIG. 2 by a transfer mechanism.

The second plate portion 53 is provided at the upper side of the fluid passage member 41 as shown in FIGS. 4 and 5 and is formed extending in the direction opposite to the transfer direction (upper stream side, left side as viewed in FIG. 1) from the fluid passage member 41. As shown in FIG. 5, the second plate portion 53 is formed such that the tip end side is positioned upward above the horizontal plane relative to the base end side. In other words, the inclination angle of the first plate portion 52 relative to the horizontal plane is different from the inclination angle of the second plate portion 53 relative to the horizontal plane. Then, the first plate portion 52 and the second plate portion 53 are provided to be unsymmetrical relative to the culture medium holding portions 51a through 51c.

Further, the second plate portion 53 includes a plurality of second slits 53a through 53c at the positions corresponding to the positions of the culture medium holding portions 51a through 51c. The second slits 53a through 53c are open to the tip end side of the second plate portion 53. Each of the width of the second slits 53a through 53c is formed to be wider than each width of the corresponding culture medium holding portions 51a through 51c. It is noted that in FIGS. 1 and 5, the widths of the first slits 52a through 52c are shown as different in widths of the second slits 53a through 53c. However, the widths of the first and the second slits 51a through 51c and 53a through 53c may be set to be the same. In order for easy understanding of the structure of the first and the second slits 51a through 51c and 53a through 53c, the size of the width is indicated as different on the drawings.

Figure 6:
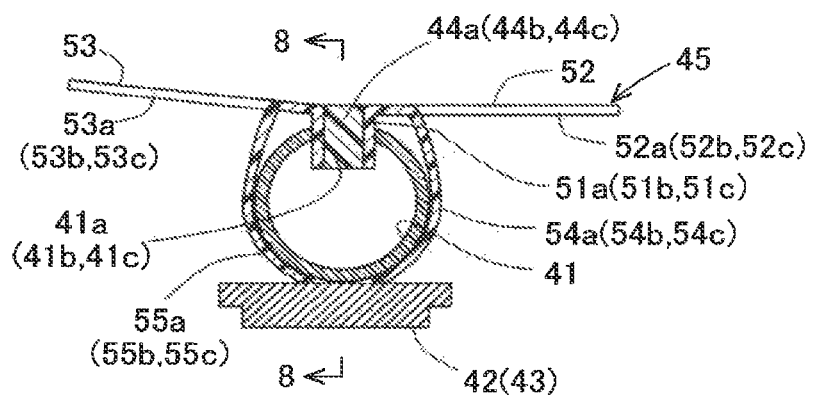
FIG. 6 is an enlarged view of the transfer unit shown in FIG. 5, cut along the line 6-6 of FIG. 5.

The first winding portions 54a through 54c are wound around the outer periphery of the fluid passage member 41 as shown in FIGS. 5 and 6. The first winding portions 54a through 54c are formed by the members corresponding to the first slits 52a through 52c when the first slits 52a through 52c are formed by lancing machining. Accordingly, the first winding portions 54a through 54c are formed at the positions corresponding to the positions of the culture medium holding portions 51a through 51c. The first winding portions 54a through 54c are formed by lancing machining to be in the shape following along the outer peripheral surface of the fluid passage member 41.

The second winding portions 55a through 55c are wound around the outer periphery of the fluid passage member 41. Most portions of the outer peripheral surface of the fluid passage member 41 are wound around by the first winding portions 54a through 54c and the second winding portions 55a through 55c. The second winding portions 55a through 55c are formed by the members corresponding to the second slits 53a through 53c, when the second slits 53a through 53c are formed by lancing machining. Accordingly, the second winding portions 55a through 55c are formed at the positions corresponding to the positions of the culture medium holding portions 51a through 51c. The second winding portions 55a through 55c are formed by lancing machining to be in the shape following along the outer peripheral surface of the fluid passage member 41.

(3. Mutual Positional Relationship Between Transfer Units & Lighting Devices)

The respective transfer units 31 through 37 are formed as shown in FIGS. 4 through 8. Next, the mutual position relationship between the transfer units 31 through 37 and the lighting devices 16 through 18 will be explained again with reference to FIGS. 1 through 3.

The leaves 91 of the plant on the transfer units 31 through 33 have grown very little, and accordingly, the transfer units 31 through 33 are mutually positioned adjacently close to one another. In other words, the distance between the fluid passage members 41 on the mutually neighboring transfer units become small. Under this situation, the second plate portion 53 of the preceding transfer unit 32 overlaps with the first plate portion 52 of the following transfer unit 31 in an up/down direction. In more detail, the first plate portion 52 of the following transfer unit 31 advances under the second plate portion 53 of the preceding transfer unit 32. Further, the first slits 52a through 52c of the following transfer unit 31 enter into the culture medium holding portions 51a through 51c of the preceding transfer unit 32. On the other hand, the second slits 53a through 53c of the preceding transfer unit 32 allow the base portion of the leaves 91 of the following transfer unit 31 to enter thereinto. It is noted that the positioning relationship between the transfer units 32 and 33 is same with the positioning relationship between the transfer units 31 and 32 as explained above.

The leaves 91 of the plants on the transfer units 34 and 35 are grown up to some extent and accordingly, the transfer units 34 and 35 are somewhat separated from each other, compared to the spatial relationship between the transfer units 31 through 33. In other words, the distance between the fluid passage members 41 of the neighboring transfer units 33 and 34 becomes large by a certain amount. Under this situation, the second plate portion 53 of the preceding transfer unit 34 and the first plate portion 52 of the following transfer unit 33 are partially overlapped with one another in an up/down direction. In more detail, the first plate portion 52 of the following transfer unit 33 advances under the second plate portion 53 of the preceding transfer unit 34. It is noted here that the first slits 52a through 52c of the following transfer unit 33 are positioned spatially apart from the culture medium holding portions 51a through 51c of the preceding transfer unit 34. Further, it is noted that the second slits 53a through 53c of the preceding transfer unit 34 are positioned separated from the base portion of the leaves 91 of the plants of the following transfer unit 33. It is also noted that the positioning relationship between the transfer units 34 and 35 is same with the positioning relationship between the transfer units 33 and 34, as explained above.

The leaves 91 of the plants on the transfer units 36 and 37 are largely grown up and accordingly, the transfer units 36 and 37 are greatly separated from each other, compared to the relationship between the transfer units 31 through 33. In other words, the distance between the fluid passage members 41 of the neighboring transfer units 35 and 36 becomes large by a certain amount. Under this situation, the second plate portion 53 of the preceding transfer unit 36 and the first plate portion 52 of the following transfer unit 35 are not overlapped with one another and are positioned separated from each other in the transfer direction. Naturally, the first slits 52a through 52c of the following transfer unit 35 are positioned apart from the culture medium holding portions 51a through 51c of the preceding transfer unit 36. Further, the second slits 53a through 53c of the preceding transfer unit 36 are positioned separated from the base portion of the leaves 91 of the plants of the following transfer unit 35. It is noted that the positioning relationship between the transfer units 36 and 37 is same with the positioning relationship between the transfer units 35 and 36 as explained above.

The first lighting device 16 which faces the transfer units 31 through 33 sheds light to the seedling culture media 44a through 44c from the closest position therefrom. The second lighting device 17 which faces the transfer units 34 and 35 sheds light to the seedling culture media 44a through 44c from the position far therefrom by the height of the grown leaves 91. The third lighting device 18 which faces the transfer units 36 and 37 sheds light to the seedling culture media 44a through 44c from the position most far therefrom. In other words, the lighting devices 16 through 18 are installed to the positions corresponding to the height of the plants in response to growing.

The worker cuts the base portion of the leaves 91 of the plant on the transfer unit 37 by a cutting tool and separates the leaves 91 from the root portion 92 of the plant. Thus, only the leaves 91 of the plants can be obtained. Thus, the obtained leaves 91 are packed for example, by a packing material and are shipped.

<Modified Embodiment of First Embodiment>

According to the embodiment explained above, the first plate portion 52 enters under side of the second plate portion 53 and the first slits 52a through 52c advance to the culture medium holding portions 51a through 51c provided on the preceding fluid passage member 41, when the distance between the neighboring fluid passage members 41 becomes small. The second plate portion 53 positions on the upper side of the first plate portion 52 and the second slits 53a through 53c allow the base portion of the leaves 91 on the following fluid passage member 41 to enter thereinto, when the distance between the neighboring fluid passage members 41 becomes small.

As an alternative, the first and the second plate portions 52 and 53 may be structured as follows: the first plate portion 52 is positioned on the upper side of the second plate portion 53 and the first slits 52a through 53c may allow the base portion of the leaves 91 of the plant on the following fluid passage member 41 to advance thereinto, when the distance between the neighboring fluid passage members 41 becomes small. The second plate portion 53 enters beneath the first plate portion 52 and the second slits 53a through 53c may allow the culture medium holding portions 51a through 51c provided on the preceding fluid passage member 41 to advance thereinto, when the distance between the neighboring fluid passage members 41 becomes small.

According to the embodiment, the first plate portion 52 is formed such that the tip end side and the base end side is positioned on horizontal plane, or the tip end side is positioned downward from the horizontal plane relative to the base end side. The second plate portion 53 is formed such that the tip end side is positioned upward above the horizontal plane relative to the base end side.

As an alternative, the first and the second plate portions 52 and 53 may be structured as follows: the first plate portion 52 is formed such that the tip end side is positioned downward above the horizontal plane relative to the base end side and the second plate portion 53 is formed such that the tip end side and the base end side is positioned on horizontal plane, or the tip end side is positioned upward from the horizontal plane relative to the base end side.

Further, according to the embodiment, the first plate portion 52 and the second plate portion 53 are provided to be unsymmetrical relative to the culture medium holding portions 51a through 51c. However, as an alternative, as shown in FIG. 9, the first plate portion 152 and the second plate portion 153 are provided to be symmetrical relative to the culture medium holding portions 151 and the through hole 141a of the fluid passage member 141 may be formed to be penetrating, in a direction inclined downward from vertical upper side.

<Second Embodiment>

Figure 10:
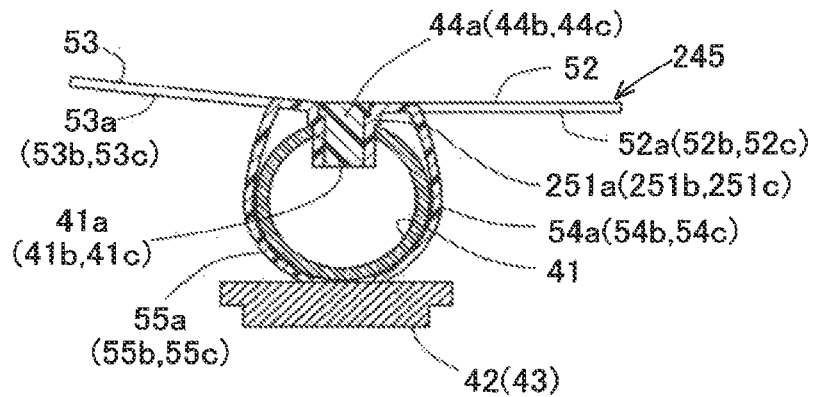
FIG. 10 is a cross sectional view of a transfer unit of the plant cultivation device according to the second embodiment.

The plant holding portion 245 of the plant cultivation device 1 according to the second embodiment includes culture medium holding portions 251a through 251c, the first plate portion 52, the second plate portion 53, the first winding portions 54a through 54c and the second winding portions 55a through 55c, as shown in FIG. 10. The plant holding portion 245 is formed by, for example, PP (Polypropylene) resin or PET (Polyethylene Terephthalate) and formed integrally by press forming. It is noted that the plant holding portion 245 according to the second embodiment differs from the plant holding portion 45 of the first embodiment only in the structure of the seedling culture media 251a through 251c.

Each of the culture medium holding portions 251a through 251c has a stepped portion on each outer peripheral surface. In other words, each of the culture medium holding portions 251a through 251c is formed in a stepped shape so that the tip end side becomes thin in diameter. The stepped portion of the culture medium holding portions 251a through 251c is brought into contact with the fluid passage member 41 to form a gap between the first and the second plate portions 52 and 53 and the fluid passage member 41. Further, the culture medium holding portions 251a through 251c are arranged, a part thereof being projecting outside of the fluid passage member 41.

<Third Embodiment>

Figure 11:
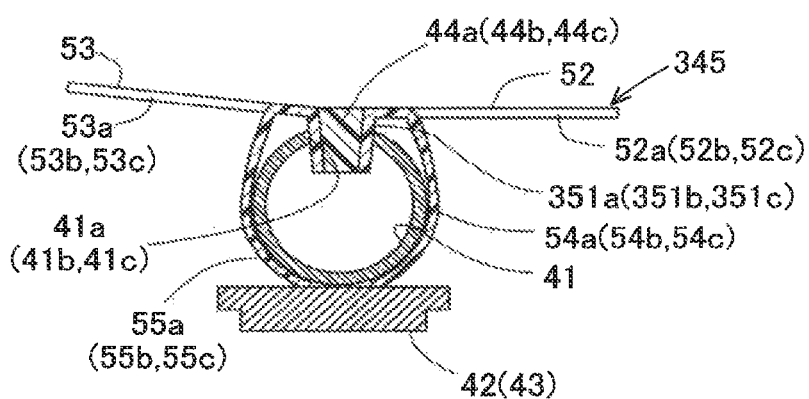
FIG. 11 is a cross sectional view of a transfer unit of the plant cultivation device according to the third embodiment.

The plant holding portion 345 of the plant cultivation device 1 according to the third embodiment includes culture medium holding portions 351a through 351c, the first plate portion 52, the second plate portion 53, the first winding portions 54a through 54c and the second winding portions 55a through 55c, as shown in FIG. 11. The plant holding portion 345 is formed by, for example, PP (Polypropylene) resin or PET (Polyethylene Terephthalate) and formed integrally by press forming. It is noted that the plant holding portion 345 according to the third embodiment differs from the plant holding portion 45 of the first embodiment only in the structure of the seedling culture media 351a through 351c.

Each of the culture medium holding portions 351a through 351c has a tapered outer peripheral surface so that the tip end side becomes thin in diameter. Further, the diameters of the through holes 41a through 41c of the fluid passage member 41 are larger than the diameters of the tip end side of the outer peripheral surfaces of the culture medium holding portions 351a through 351c and smaller than the diameters of the base end side of the outer peripheral surfaces of the culture medium holding portions 351a through 351c. A middle portion of the outer peripheral surfaces of the culture medium holding portions 351a through 351c engages with the through holes 41a through 41c of the fluid passage member 41. Accordingly, a gap is formed between the first and the second plate portions 52 and 53 and the fluid passage member 41. Further, the culture medium holding portions 351a through 351c are arranged, a part thereof being projecting outside of the fluid passage member 41.

<Fourth Embodiment>

Figure 12:
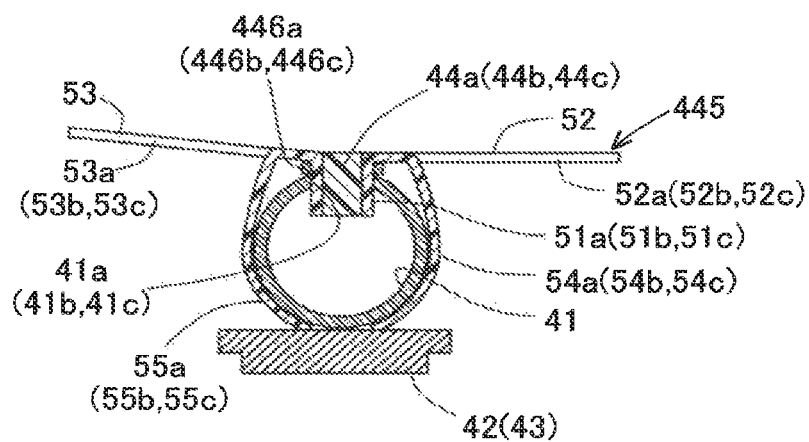
FIG. 12 is a cross sectional view of a transfer unit of the plant cultivation device according to the fourth embodiment.

The transfer units 31 through 37 of the plant cultivation device 1 according to the fourth embodiment includes, as shown in FIG. 12, fluid passage member 41, supporting members 42 and 43, seedling culture media 44a through 44c, plant holding portion 45 and sandwiching members 446a through 446c. It is noted that the transfer units 31 through 37 of this embodiment differs from the transfer units 31 through 37 of the first embodiment only in the structure of sandwiching members 446a through 446c.

The sandwiching members 446a through 446c are formed separately from the culture medium holding portions 51a through 51c and arranged at the periphery side of the culture medium holding portions 51a through 51c to be sandwiched between the first and the second plate portions 52 and 53 and the fluid passage member 41. A gap is provided between the first and the second plate portions 52 and 53 and the fluid passage member 41 by the sandwiching members 446a through 446c. Further, the culture medium holding portions 51a through 51c are arranged, a part thereof being projecting outside of the fluid passage member 41.

<Fifth Embodiment>

Figure 13:
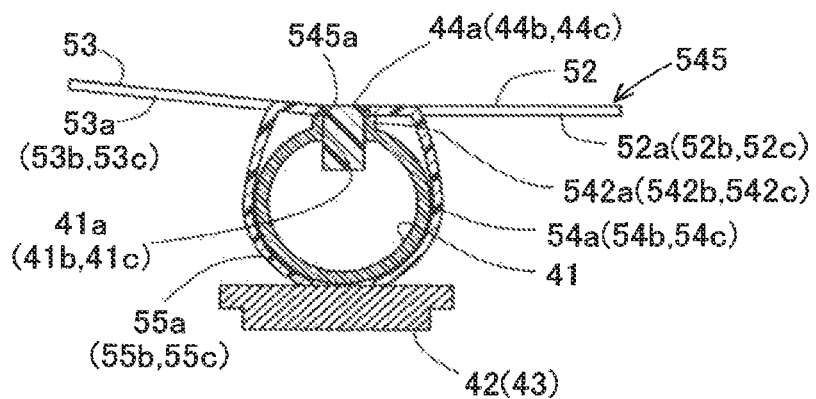
FIG. 13 is a cross sectional view of a transfer unit of the plant cultivation device according to the fifth embodiment.

The transfer units 31 through 37 of the plant cultivation device 1 according to the fifth embodiment include, as shown in FIG. 13, fluid passage member 41, supporting members 42 and 43, seedling culture media 44a through 44c, culture medium holding portions 542a through 542c and plant holding portion 545. It is noted that the transfer units 31 through 37 of this embodiment differs from the transfer units 31 through 37 of the first embodiment only in the structures of the culture medium holding portions 542a through 542c and plant holding portion 545.

The culture medium holding portions 542a through 542c are formed at the outside of the fluid passage member 41 to be in communication with the through holes 41a through 41c thereof. In detail, the culture medium holding portions 542a through 542c are formed integrally with the fluid passage member 41 to be in communication with the through holes 41a through 41c of the fluid passage member 41. Further, the culture medium holding portions 542a through 542c are provided with a stepped portion at the outer peripheral surface thereof. In other words, the culture medium holding portions 542a through 542c are formed stepwise so that the tip end side thereof becomes thin in diameter.

The plant holding portion 545 is structured in a shape of the plant holding portion 45 of the first embodiment, but the culture medium holding portions 51a through 51c being eliminated therefrom. In other words, the plant holding portion 545 includes the first plate portion 52, the second plate portion 53, the first winding portions 54a through 54c and the second winding portions 55a through 55c. It is noted that the plant holding portion 545 is provided with a through hole 545a at a portion of the culture medium holding portions 51a through 51c located between the first and the second plate portions 52 and 53. The through hole 545a of the plant holding portion 545 is brought into contact with the stepped portion of the culture medium holding portions 542a through 542c. Accordingly, a gap is formed between the first and the second plate portions 52 and 53 and the fluid passage member 41.

<Sixth Embodiment>

Figure 14:
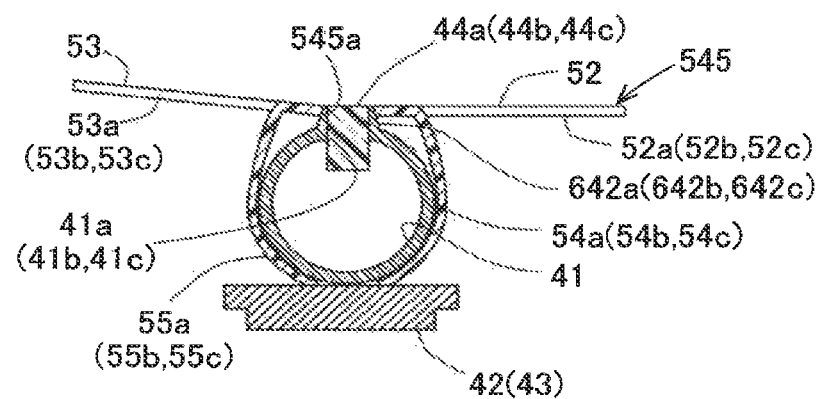
FIG. 14 is a cross sectional view of a transfer unit of the plant cultivation device according to the sixth embodiment.

The transfer units 31 through 37 of the plant cultivation device 1 according to the sixth embodiment include, as shown in FIG. 14, fluid passage member 41, supporting members 42 and 43, seedling culture media 44a through 44c, culture medium holding portions 642a through 642c and plant holding portion 545. It is noted that the transfer units 31 through 37 of this embodiment differs from the transfer units 31 through 37 of the first embodiment only in the structure of the culture medium holding portions 642a through 642c.

Each of the culture medium holding portions 642a through 642c has a tapered outer peripheral surface so that the tip end side becomes thin in diameter. Further, the diameters of the through holes 545a of the plant holding portion 545 is larger than the diameters of the tip end side of the outer peripheral surfaces of the culture medium holding portions 642a through 642c and smaller than the diameters of the base end side of the outer peripheral surfaces of the culture medium holding portions 642a through 642c. A middle portion of the outer peripheral surfaces of the culture medium holding portions 642a through 642c engages with the through hole 545a of the plant holding portion 545. Accordingly, a gap is formed between the first and the second plate portions 52 and 53 and the fluid passage member 41.

<Seventh Embodiment>

Figure 15:
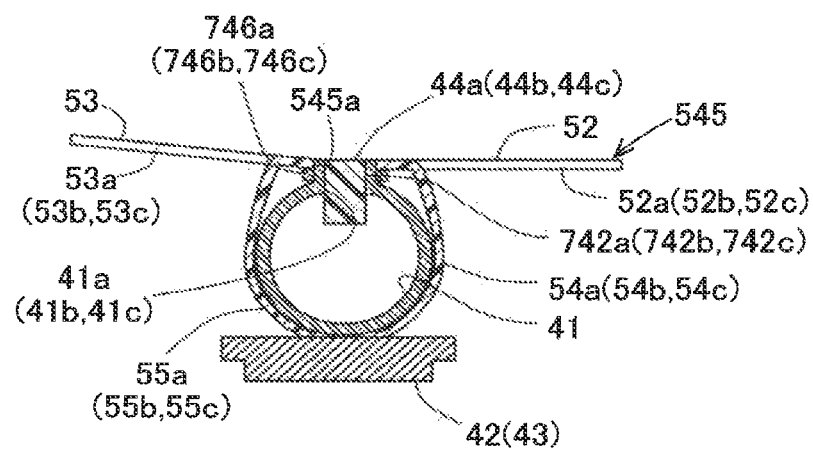
FIG. 15 is a cross sectional view of a transfer unit of the plant cultivation device according to the seventh embodiment.

The transfer units 31 through 37 of the plant cultivation device 1 according to the seventh embodiment includes, as shown in FIG. 15, fluid passage member 41, supporting members 42 and 43, seedling culture media 44a through 44c, culture medium holding portions 742a through 742c, plant holding portion 545 and sandwiching members 746a through 746c. It is noted that the transfer units 31 through 37 of this embodiment differs from the transfer units 31 through 37 of the first embodiment only in the structures of the culture medium holding portions 742a through 742c and the sandwiching members 746a through 746c.

The culture medium holding portions 742a through 742c are not provided with the stepped portion at the outer periphery and are formed in a cylindrical shape with a circular cross section. The sandwiching members 746a through 746c are separately from the culture medium holding portions 742a through 742c and arranged at the outer periphery side of the culture medium holding portions 742a through 742c to be sandwiched between the first and the second plate portions 52 and 53 and the fluid passage member 41. A gap is provided between the first and the second plate portions 52 and 53 and the fluid passage member 41 by the sandwiching members 746a through 746c <Effect of Embodiments>

The plant cultivation device 1 includes a plurality of fluid passage members 41 formed with a fluid passage through which a culture fluid flows and formed with a plurality of through-holes 41a through 41c on an upper surface thereof, transfer mechanisms 13 through 15 which transfer the plurality of fluid passage members 41 such that a distance between neighboring fluid passage members 41 among the plurality of fluid passage members 41 becomes variable, a seedling culture media 44a through 44c, on which seeds of the plants are arranged, culture medium holding portions 51a through 51c, 251a through 251c, 351a through 351c, 451a through 451c, 542a through 542c, 642a through 642c and 742a through 742c formed in a cylindrical shape, accommodating therein the seedling culture media 44a through 44c to hold thereof, inserted into the plurality of through-holes 41a through 41c of the plurality of the fluid passage members 41 or arranged to be in communication with the plurality of through-holes 41a through 41c of the plurality of the fluid passage members 41 and absorbing the culture fluid into the seedling culture media 44a through 44c, a first plate portion 52 provided on the upper side of the fluid passage members 41 and formed extending in a transfer direction from the fluid passage members 41 and a second plate portion 53 provided on the upper side of the fluid passage members 41 and formed extending in a direction opposite to the transfer direction from the fluid passage members 41. When the distance between the neighboring fluid passage members 41 becomes small, the second plate portion 53 provided on a preceding fluid passage member 41 and the first plate portion 52 provided on a following fluid passage member 41 are overlapped in an up/down direction and when the distance between the neighboring fluid passage members 41 become large, the second plate portion 53 provided on the preceding fluid passage member 41 and the first plate portion 52 provided on the following fluid passage member 41 are separated from each other with respect to the transfer direction.

Under the state that the second plate portion 53 provided on the preceding fluid passage member 41 and the first plate portion 52 provided on the following fluid passage member 41 are overlapped in the up/down direction, the distance between the neighboring fluid passage members 41 can be lessened. On the other hand, under the state that the second plate portion 53 provided on the preceding fluid passage member 41 and the first plate portion 52 provided on the following fluid passage member 41 are separated from each other with respect to the transfer direction, the leaves under the cultivated state are protected by the first and the second plate portions 52 and 53 not to be drooped down in sufficiently wide range. Thus, the plant cultivation device can effectively save the space for the plants particularly in an early raising stage, protecting the leaves under a cultivated state by preventing the leaves from drooping down.

The first plate portion 52 is provided with the first slits 52a through 52c which is configured to enter into the culture medium holding portions 51a through 51c, 251a through 251c, 351a through 351c, 451a through 451c, 542a through 542c, 642a through 642c and 742a through 742c provided on the preceding fluid passage member 41, or which is configured to enter into a base portion of the leaves 91 of the plant on the preceding fluid passage member 41, when the distance between the two neighboring fluid passage members 41 becomes small. The overlapping amount of the first and the second plate portions 52 and 53 becomes larger under an early raising stage by the first slits 52a through 52c. As a result, the plant cultivation device 1 can effectively save the space for the plants in an early raising stage.

The second plate portion 53 is provided with the second slits 53a through 53c which is configured to enter into the culture medium holding portions 51a through 51c, 251a through 251c, 351a through 351c, 451a through 451c, 542a through 542c, 642a through 642c and 742a through 742c provided on the following fluid passage member 41, or which configured to enter into the base portion of the leaves 91 of the plant on the following fluid passage member 41, when the distance between the two neighboring fluid passage members 41 becomes small. The overlapping amount of the first and the second plate portions 52 and 53 becomes larger under an early raising stage by the first slits 52a through 52c. As a result, the plant cultivation device 1 can effectively save the space for the plants in an early raising stage.

Further, the inclination angle of the first plate portion 52 relative to the horizontal plane is different from the inclination angle of the second plate portion 53 relative to the horizontal plane. Thus, due to this structure, the first and the second plate portions 52 and 53 are surely moved to the state of overlapping with each other.

For example, one of the first plate portion 52 and the second plate portion 53 is formed such that the tip end side and the base end side is positioned on horizontal plane, or the tip end side is positioned downward from the horizontal plane relative to the base end side. The other of the first plate portion 52 and the second plate portion 53 is formed such that the tip end side is positioned upward above the horizontal plane relative to the base end side. Thus, due to this structure, the first and the second plate portions 52 and 53 are surely moved to the state of overlapping with each other.

Further, as an alternative, one of the first plate portion 52 and the second plate portion 53 is formed such that the tip end side is positioned downward from the horizontal plane relative to the base end side. The other of the first plate portion 52 and the second plate portion 53 is formed such that the tip end side and the base end side is positioned on horizontal plane, or the tip end side is positioned upward from the horizontal plane relative to the base end side. Thus, due to this structure, the first and the second plate portions 52 and 53 are surely moved to the state of overlapping with each other.

Then, the first plate portion 52 and the second plate portion 53 are provided to be unsymmetrical relative to the culture medium holding portions 51a through 51c, 251a through 251c, 351a through 351c, 451a through 451c, 542a through 542c, 642a through 642c and 742a through 742c. As a result, due to this structure, the first and the second plate portions 52 and 53 are surely moved to the state of overlapping with each other.

As an alternative, the first plate portion 152 and the second plate portion 153 are provided to be symmetrical relative to the culture medium holding portions 151 and the through hole 141a of the fluid passage member 141 may be formed to be penetrating, in a direction inclined downward from vertical upper side. As a result, due to this structure, the first and the second plate portions 52 and 53 are surely moved to the state of overlapping with each other.

Further, the plant cultivation device 1 is provided with a plant holding portion 45 which is formed integrally by press forming. The plant holding portion 45 includes the first plate portion 52, the second plate portion 53 and the first winding portion 54a through 54c. The first winding portion 54a through 54c formed by a member corresponding to the first slits 52a through 52c when the slits 52a through 52c are formed by lancing machining and the first winding portion 54a through 54c wound around the outer periphery of the fluid passage member 41. The portion where the first slits 52a through 52c are formed can be effectively used. Thus, the plant holding portion 45 is held to the fluid passage member 41 in a stable condition.

Further, the plant cultivation device 1 is provided with a plant holding portion 45 which is formed in one-piece by press forming. The plant holding portion 45 includes the first plate portion 52, the second plate portion 53 and the second winding portion 55a through 55c. The second winding portion 55a through 55c formed by a member corresponding to the second slits 53a through 53c when the slits 53a through 53c are formed by lancing machining and the second winding portion 55a through 55c wound around the outer periphery of the fluid passage member 41. The portion where the second slits 53a through 53c are formed can be effectively used. Thus, the plant holding portion 45 is held to the fluid passage member 41 in a stable condition.

Further, according to the first through fourth embodiments, the culture medium holding portions 51a through 51c, 251a through 251c, 351a through 351c and 451a through 451c are formed integrally with the first and the second plate portions 52 and 53 and are inserted into the through holes 41a through 41c of the fluid passage member 41. Further, portions of the culture medium holding portions 51a through 51c, 251a through 251c, 351a through 351c and 451a through 451c are arranged projecting outside of the fluid passage member 41 to form a gap between the first and the second plate portions 52 and 53 and the fluid passage member 41. Thus, the first slits 52a through 52c or the second slits 53a through 53c are easily inserted into the gap between the first and the second plate portions 52 and 53 and the fluid passage member 41.

Further, according to the second embodiment, the outer peripheral surface of the culture medium holding portion 251a through 251c is provided with a stepped portion. By the contact of the fluid passage member 41 with the stepped portion, a gap is formed between the first and the second plate portions 52 and 53 and the fluid passage member 41 and thus, the first slits 52a through 52c or the second slits 53a through 53c are easily inserted into a gap between the first and the second plate portions 52 and 53 and the fluid passage member 41.

Further, according to the third embodiment, each of the culture medium holding portions 351a through 351c has a tapered outer peripheral surface so that the tip end side becomes thin in diameter. Further, the diameters of the through holes 41a through 41c of the fluid passage member 41 are larger than the diameters of the tip end side of the outer peripheral surfaces of the culture medium holding portions 351a through 351c and smaller than the diameters of the base end side of the outer peripheral surfaces of the culture medium holding portions 351a through 351c. A middle or intermediate portion of the outer peripheral surfaces of the culture medium holding portions 351a through 351c engages with the through holes 41a through 41c of the fluid passage member 41. Accordingly, a gap is formed between the first and the second plate portions 52 and 53 and the fluid passage member 41. Thus, the gap is surely formed between the first and the second plate portions 52 and 53 and the fluid passage member 41 and the first slits 52a through 52c or the second slits 53a through 53c are easily inserted into a gap between the first and the second plate portions 52 and 53 and the fluid passage member 41.

Further, according to the fourth embodiment, the plant cultivation device 1 includes a sandwiching member 446a through 446c formed separately from the culture medium holding portion 451a through 451c, arranged on the outer peripheral side of the culture medium holding portion 451a through 451c and sandwiched between the first and the second plate portions 52 and 53 and the fluid passage member 41. Accordingly, a gap is surely formed between the first and the second plate portions 52 and 53 and the fluid passage member 41 and the first slits 52a through 52c or the second slits 53a through 53c are easily inserted into a gap between the first and the second plate portions 52 and 53 and the fluid passage member 41.

Further, according to the fifth through seventh embodiments, the culture medium holding portions 542a through 542c, 642a through 642c and 742a through 742c are formed integrally with the fluid passage member 41 to be in communication with the through holes 41a through 41c of the fluid passage member 41. Further, the portions of the culture medium holding portions 542a through 542c, 642a through 642c and 742a through 742c are arranged projecting outside of the fluid passage member 41 to form a gap between the first and the second plate portions 52 and 53 and the fluid passage member 41. Thus, the first slits 52a through 52c or the second slits 53a through 53c are easily inserted into a gap between the first and the second plate portions 52 and 53 and the fluid passage member 41. Still further, the worker holds the first and the second plate portions 52 and 53 upward and separates the first and the second plate portions 52 and 53 from the culture medium holding portions 542a through 542c, 642a through 642c and 742a through 742c under the state that the leaves 91 have been grown up. Under such state, the worker cuts the base portion of the leaves 91 to separate the leaves 91 from the root portion 92 of the plant. In other words, the workability of cutting the leaves 91 from the root portion 92 can be improved.

According to the fifth embodiment, each of the culture medium holding portions 542a through 542c has a stepped portion on each outer peripheral surface. The stepped portion of the culture medium holding portions 542a through 542c is brought into contact with the fluid passage member 41 to form a gap between the first and the second plate portions 52 and 53 and the fluid passage member 41. Accordingly, a gap is formed between the first and the second plate portions 52 and 53 and the fluid passage member 41. Thus, the gap is surely formed between the first and the second plate portions 52 and 53 and the fluid passage member 41 and the first slits 52a through 52c or the second slits 53a through 53c are easily inserted into a gap between the first and the second plate portions 52 and 53 and the fluid passage member 41.

Further, according to the sixth embodiment, each of the culture medium holding portions 642a through 642c has a tapered outer peripheral surface so that the tip end side becomes thin in diameter. Further, the diameters of the through hole 545a formed between the first and the second plate portions 52 and 53 are formed to be larger than the diameters of the tip end side of the outer peripheral surfaces of the culture medium holding portions 642a through 642c and smaller than the diameters of the base end side of the outer peripheral surfaces of the culture medium holding portions 642a through 642c. A middle or an intermediate portion of the outer peripheral surfaces of the culture medium holding portions 642a through 642c engages with the through hole 545a formed between the first and the second plate portions 52 and 53. Accordingly, a gap is formed between the first and the second plate portions 52 and 53 and the fluid passage member 41. Further, the culture medium holding portions 351a through 351c are arranged, a part thereof being projecting outside of the fluid passage member 41.

Further, according to the seventh embodiment, the plant cultivation device 1 includes a sandwiching member 746a through 746c formed separately from the culture medium holding portion 742a through 742c, arranged on the outer peripheral side of the culture medium holding portion 742a through 742c and sandwiched between the first and the second plate portions 52 and 53 and the fluid passage member 41. Accordingly, a gap is surely formed between the first and the second plate portions 52 and 53 and the fluid passage member 41 and the first slits 52a through 52c or the second slits 53a through 53c are easily inserted into a gap between the first and the second plate portions 52 and 53 and the fluid passage member 41.

REFERENCE SIGNS LIST

1 . . . plant cultivation device, 11, 12 . . . rail, 13, 14, 15 . . . transfer mechanism, 16, 17, 18 . . . lighting device, 21 . . . culture fluid supplying portion, 22 . . . culture fluid collecting portion, 31 through 37 . . . transfer unit, 41 . . . fluid passage member, 41a through 41c . . . through-holes, 41d . . . hole, 42, 43 . . . supporting member, 44, 44a through 44c . . . seedling culture medium, 45, 245, 345, 545 . . . plant holding portion, 51a through 51c, 251a through 251c, 351a through 351c, 451a through 451c, 542a through 542c, 642a through 642c and 742a through 742c . . . culture medium holding portion, 52, 152 . . . first plate portion, 52a, through 52c . . . first slit, 53, 153 . . . second plate portion, 53a, through 53c . . . second slit, 54a through 54c . . . first winding portion, 55a through 55c . . . second winding portion, 141 . . . fluid passage member, 141a through 141c . . . through hole, 91 . . . leaves, 92 . . . root portion, 446a through 446c, 746a through 746c . . . sandwiching member, 545a . . . through hole.

The invention claimed is:

1. A plant cultivation device comprising:
a plurality of fluid passage members formed with a fluid passage through which a culture fluid flows and formed with a through-hole on an upper surface thereof;
a transfer mechanism which transfers the plurality of fluid passage members such that a distance between two neighboring fluid passage members among the plurality of fluid passage members becomes variable;
a seedling culture medium, on which seeds of a plant are arranged;
a culture medium holding portion formed in a cylindrical shape, accommodating therein the seedling culture medium, inserted into the through-hole of the plurality of the fluid passage members or arranged in communication with the through-hole of the plurality of fluid passage members and absorbing the culture fluid into the seedling culture medium;
a first plate portion provided on an upper side of the fluid passage members and formed in a plate shape extending in a transfer direction from the fluid passage members; and
a second plate portion provided on the upper side of the fluid passage members and formed in a plate shape extending in a direction opposite to the transfer direction from the fluid passage members, wherein
when the distance between the two neighboring fluid passage members becomes small, the second plate portion provided on a preceding fluid passage member and the first plate portion provided on a following fluid passage member are overlapped in an up or down direction; and
when the distance between the two neighboring fluid passage members becomes large, the second plate portion provided on the preceding fluid passage member and the first plate portion provided on the following fluid passage member are separated from each other with respect to the transfer direction,
wherein one of the first plate portion and the second plate portion is formed such that a tip end side and a base end side is positioned on a horizontal plane, or the tip end side is positioned downward from the horizontal plane relative to the base end side, and
the other of the first plate portion and the second plate portion is formed such that the tip end side is positioned upward above the horizontal plane relative to the base end side.

2. The plant cultivation device according to claim 1, wherein
the first plate portion is provided with a first slit which is configured to enter into the culture medium holding portion provided on the preceding fluid passage member, or which is configured to enter into a base portion of the leaves of the plant on the preceding fluid passage member, when the distance between the two neighboring fluid passage members becomes small.

3. The plant cultivation device according to claim 2, further comprising:
a plant holding portion formed in one-piece by press-forming, and the plant holding portion including:
the first plate portion;
the second plate portion; and
a first winding portion which is formed by a member corresponding to the first slit when the first slit is formed by lancing machining and wound around an outer periphery of the fluid passage members.

4. The plant cultivation device according to claim 2, wherein
the culture medium holding portion is formed in one-piece with the first plate portion and the second plate portion and is inserted into the through hole of the fluid passage members, and
a portion of the culture medium holding portion is arranged projecting outside of the fluid passage members to form a first gap between the first plate portion and the fluid passage members and a second gap between the second plate portion and the fluid passage members.

5. The plant cultivation device according to claim 4, wherein
the culture medium holding portion is formed with a stepped portion, and by a contact of the stepped portion with the fluid passage members, the first gap is formed between the first plate portion and the fluid passage members and the second gap is formed between the second plate portion and the fluid passage members.

6. The plant cultivation device according to claim 4, wherein the culture medium holding portion has a tapered outer peripheral surface so that a tip end side becomes thin in diameter, a diameter of the through hole of the fluid passage members is formed to be larger than a diameter of the tip end side of the outer peripheral surface of the culture medium holding portion and smaller than a diameter of a base end side of an outer peripheral surface of the culture medium holding portion, and a middle portion of the outer peripheral surface of the culture medium holding portion engages with the through hole of the fluid passage members to form the first gap between the first plate portion and the fluid passage members and the second gap between the second plate portion and the fluid passage members.

7. The plant cultivation device according to claim 4, further comprising:

a sandwiching member formed separately from the culture medium holding portion and arranged at an outer periphery side of the culture medium holding portion to be sandwiched between the first plate portion and the fluid passage members and between the second plate portion and the fluid passage members.

8. The plant cultivation device according to claim 2, wherein the culture medium holding portion is formed in one-piece with the fluid passage members, the culture medium holding portion to be inserted into the through hole of the fluid passage members, and a portion of the culture medium holding portion is arranged projecting outside of the fluid passage members to form a first gap between the first plate portion and the fluid passage members and a second gap between the second plate portion and the fluid passage members.

9. The plant cultivation device according to claim 8, wherein the culture medium holding portion is formed with a stepped portion on an outer peripheral surface thereof, and by a contact of the stepped portion with the through hole formed between the first plate portion and the second plate portion, the first gap is formed between the first plate portion and the fluid passage member and the second gap is formed between the second plate portion and the fluid passage members.

10. The plant cultivation device according to claim 8, wherein the culture medium holding portion has a tapered outer peripheral surface so that a tip end side becomes thin in diameter, a diameter of the through hole formed between the first plate portion and the second plate portion is formed to be larger than a diameter of the tip end side of an outer peripheral surface of the culture medium holding portion and smaller than a diameter of a base end side of the outer peripheral surface of the culture medium holding portion, and a middle portion of the outer peripheral surface of the culture medium holding portion engages with the through hole formed between the first plate portion and the second plate portion, to form the first gap between the first plate portion and the fluid passage members and the second gap between the second plate portion and the fluid passage members.

11. The plant cultivation device according to claim 8, further comprising:

a sandwiching member formed separately from the culture medium holding portion and arranged at an outer periphery side of the culture medium holding portion to be sandwiched between the first plate portion and the fluid passage members and between the second plate portion and the fluid passage members.

12. The plant cultivation device according to claim 1, wherein the second plate portion is provided with a second slit which is configured to enter into the culture medium holding portion provided on the following fluid passage member, or which is configured to enter into the base portion of the leaves of the plant on the following fluid passage member, when the distance between the two neighboring fluid passage members becomes small.

13. The plant cultivation device according to claim 12, further comprising:

a plant holding portion formed in one-piece by press-forming, and the plant holding portion including:

the first plate portion;

the second plate portion; and a second winding portion which is formed by a member corresponding to the second slit when the second slit is formed by lancing machining and wound around an outer periphery of the fluid passage members.

14. The plant cultivation device according to claim 1, wherein an inclination angle of the first plate portion relative to a horizontal plane thereof and an inclination angle of the second plate portion relative to the horizontal plane thereof are different from each other.

15. The plant cultivation device according to claim 14, wherein the first plate portion and the second plate portion are provided to be unsymmetrical relative to the culture medium holding portion.

* * * * *